United States Patent [19]

Chern

[11] Patent Number: 5,248,959
[45] Date of Patent: Sep. 28, 1993

[54] EARTHQUAKE WARNING DEVICE

[76] Inventor: Wen-Bin Chern, No. 122, Kuangming Rd., Tachia Chen, Taichung Hsien, Taiwan

[21] Appl. No.: 892,742

[22] Filed: Jun. 4, 1992

[51] Int. Cl.⁵ ............................................. G01N 1/00
[52] U.S. Cl. .................................. 340/601; 340/690; 200/61.45 R; 200/DIG. 29; 73/654
[58] Field of Search ............... 340/601, 689, 690, 440, 340/429, 566, 568, 686; 73/170 R, 652, 654; 200/61.45 R, 61.52, DIG. 29; 33/366; 307/121

[56] References Cited

U.S. PATENT DOCUMENTS 4,764,761  8/1988  Maguire, III .................. 340/690
4,789,922  12/1988  Cheshire .................. 340/690 X

*Primary Examiner*—Jeffrey Hofsass
*Attorney, Agent, or Firm*—Finnegan, Henderson, Farabow, Garrett & Dunner

[57] ABSTRACT

An earthquake warning device including a speaker disposed in a housing, a casing disposed above the housing, a pair of electrically conductive sheet members disposed in a lower portion of the casing and electrically coupled to the speaker, a support disposed in the casing having a flat upper surface, and an electrically conductive ball disposed on the flat upper surface of the support. The ball will move away from the flat upper surface and downward to electrically connect the sheet members together when a vibration occurs to cause the speaker to generate a warning sound.

5 Claims, 3 Drawing Sheets

EARTHQUAKE WARNING DEVICE

BACKGROUND OF THE INVENTION

1. Field of the Invention

The present invention relates to a warning device, and more particularly to an earthquake warning device.

2. Description of the Prior Art

Earthquakes always come suddenly without warning signs. For example, the earthquake that occurred in San Francisco killed may people and destroyed many buildings and bridges and nobody knew of the earthquake until after it occurred.

The present invention provides an earthquake warning device for warning people.

SUMMARY OF THE INVENTION

The primary objective of the present invention is to provide an earthquake warning device which generates a warning sound when a small vibration occurs.

In accordance with one aspect of the invention, there is provided an earthquake warning device comprising a housing, a sounding means disposed in the housing, a casing disposed above the housing, a pair of sheet members disposed in a lower portion of the casing and coupled to the sounding means, a support disposed in the casing and including a flat upper surface, at least one ball disposed on the flat upper surface of the support, whereby, the ball moves away from the flat upper surface and moves downward to connect the sheet members when a vibration occurs, such that the sounding means generates a warning sound.

Further objectives and advantages of the present invention will become apparent from the following detailed description, with appropriate reference to the accompanying drawings.

DETAILED DESCRIPTION OF THE PREFERRED EMBODIMENT

Figure 1:
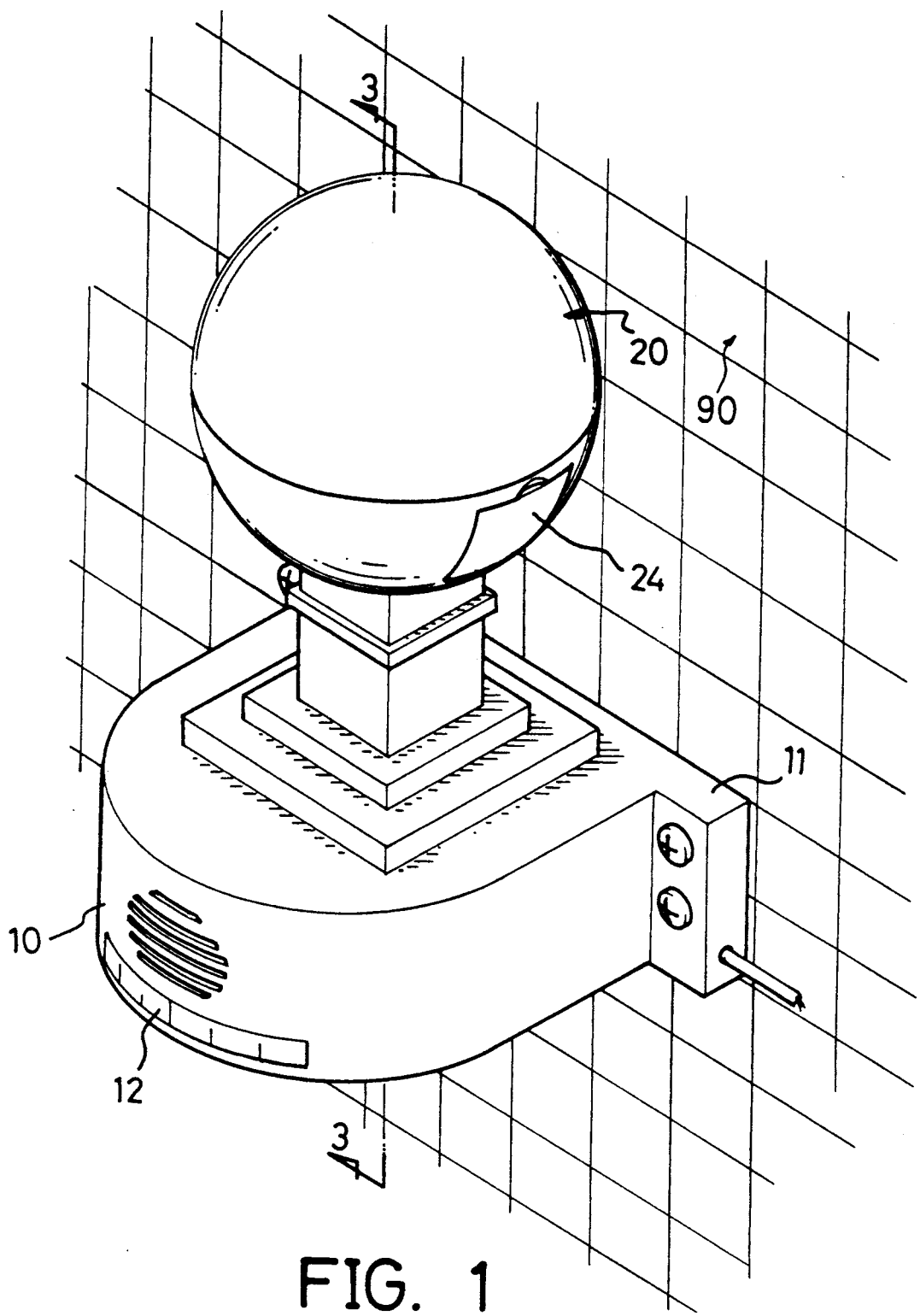
FIG. 1 is a perspective view of an earthquake warning device in accordance with the present invention.

Referring to the drawings, and initially to FIG. 1, an earthquake warning device in accordance with the present invention is fixed to a wall member 90 and comprises generally a casing 20 disposed above a housing 10 which includes a pair of flanges 11 formed thereon for fixing to the wall member 90 such as by bolts or screws. A level 12 is preferably disposed in the lower and front portion of the housing 10 so that the warning device can be disposed horizontally.

Figure 2:
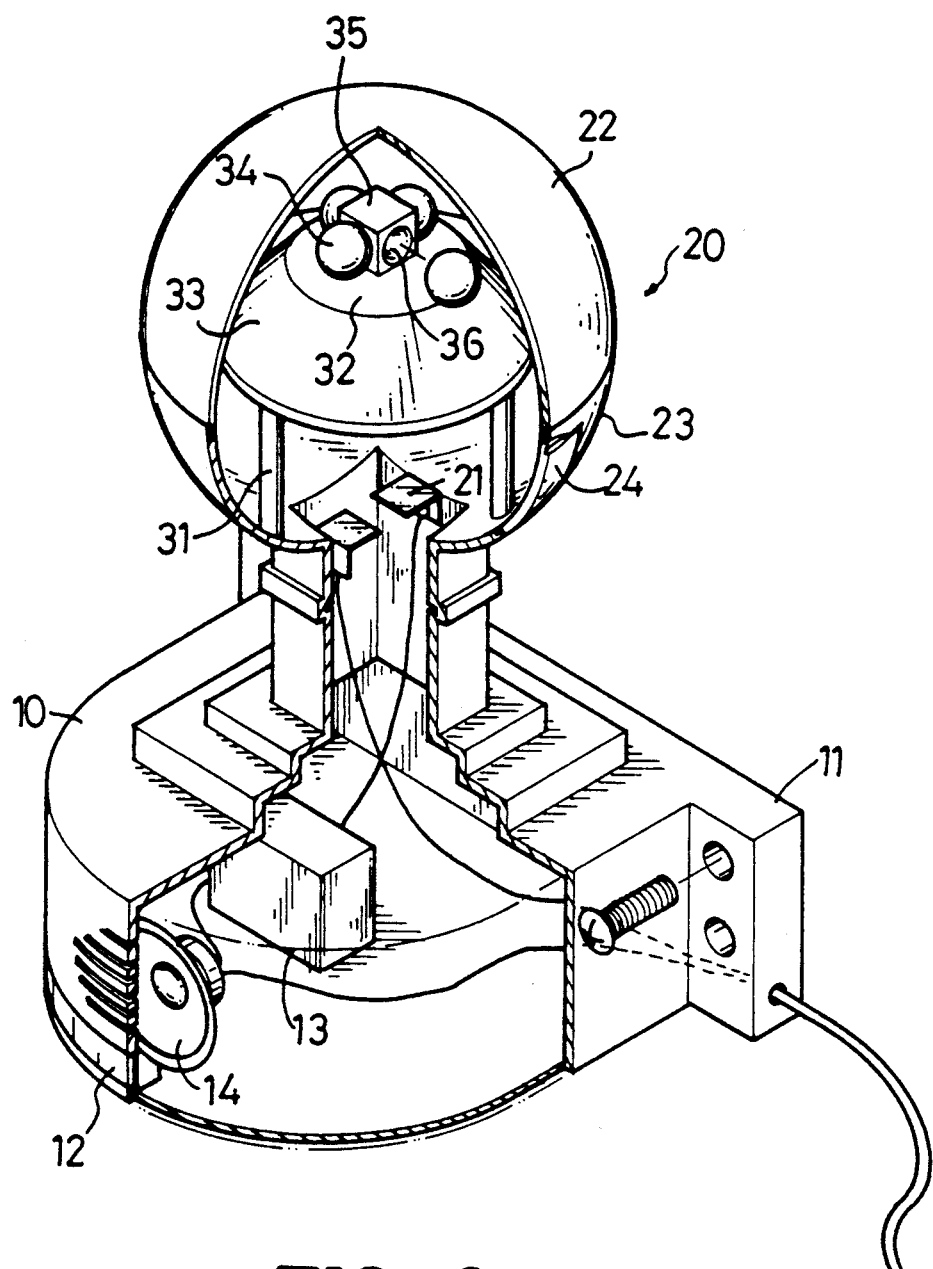
FIG. 2 is a perspective view of the earthquake warning device, in which part of the device is cut off for illustrating the interior thereof.
Figure 3:
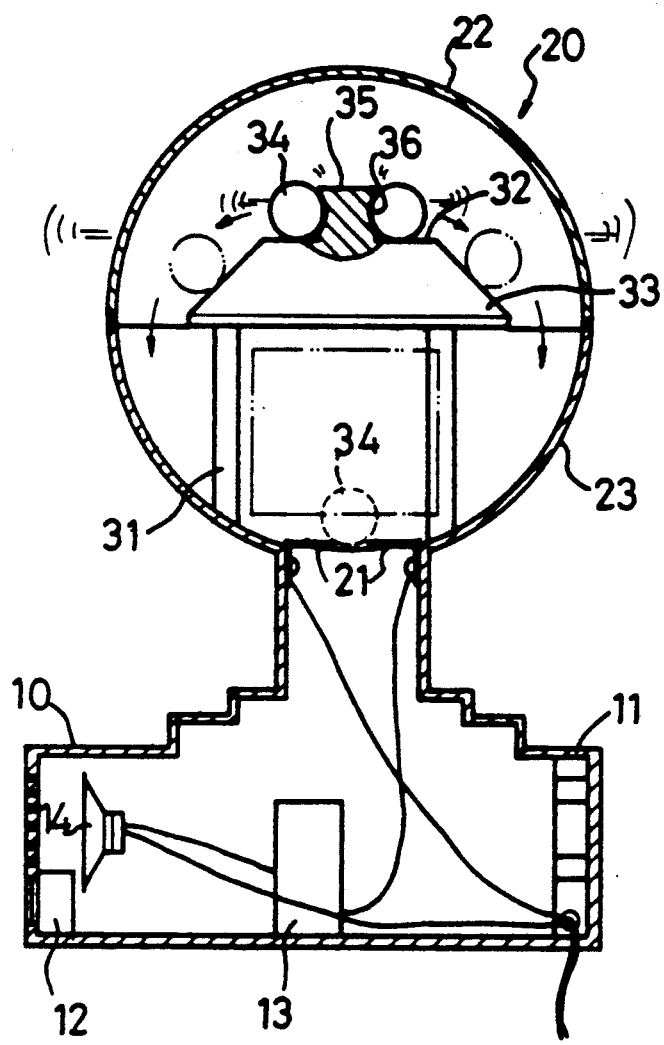
FIG. 3 is a cross sectional view of the earthquake warning device taken along lines 3—3 of FIG. 1.

Referring next to FIGS. 2 and 3, a sounding means, such as a speaker 14 is disposed in the front portion of the housing 10, a pair of conductive sheet members 21 are disposed in the lower portion of the casing 20, in which one of the sheet members 21 is electrically connected to the speaker 14 via an amplifier 13, the other of the sheet members 21 and the speaker 14 are connected to an electric source, not shown.

The casing 20 is spherical including a cap 22 disposed upon a base 23 which includes a cover 24 formed therein. A support, such as a frustum 33 is horizontally disposed in the casing 20 and supported by four posts 31 and includes a flat upper surface 32. A cube 35 is formed integral on the center portion of the flat upper surface 32 and includes four side surfaces each having a recess 36 formed therein, four balls 34 are disposed on the flat upper surface 32 and each is engaged in a respective recess 36. The four balls 34 will not stay in place if the flat upper surface 32 is not disposed horizontally. The balls 34 are made of conductive materials.

In operation, as shown in FIG. 3, when an amplitude of a vibration or of an earthquake is larger than, for example, 0.1 cm, at least one of the balls 34 will move away from the flat upper surface 32 and downward into base 23 to electrically connect the sheet members 21 such that the speaker 14 generates a warning sound. The balls 34 can be taken out via a cover 24 in base 23, and can be disposed in place again by removing the cap 22 is removed.

Accordingly, the users may be aware that a vibration with an amplitude larger than 0.1 cm occurs when the earthquake warning device in accordance with the present invention generates a warning sound, thereby, the users may take some actions in order to avoid damages.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An earthquake warning device comprising a housing, a sounding means disposed in said housing, a casing disposed above said housing, a pair of electrically conductive sheet members disposed in a lower portion of said casing and electrically coupled to said sounding means, a support disposed in said casing, said support having a flat upper surface, a cube formed integral on a center portion of said flat upper surface having four side surfaces, four electrically conductive balls disposed on said flat upper surface of said support, each ball contacting a respective side surface of said cube, whereby at least one of said balls moves away from said flat upper surface and downward to electrically connect said sheet members together when a vibration occurs to cause said sounding means to generate a warning sound.

2. A device according to claim 1, wherein each of said four side surfaces includes a recess formed therein for engagement with said ball.

3. A device according to claim 1, wherein said support is a frustum supported in said casing by at least three posts.

4. A device according to claim 1, wherein said casing includes a base, and a cap disposed above said base, and a cover is formed in said base for removing said ball.

5. A device according to claim 1, wherein a level is disposed in said housing for indicating a level condition of said housing and said casing.

* * * * *